July 31, 1934.   C. L. WALKER   1,968,185
AUTOMOBILE BRAKE
Filed Dec. 31, 1929
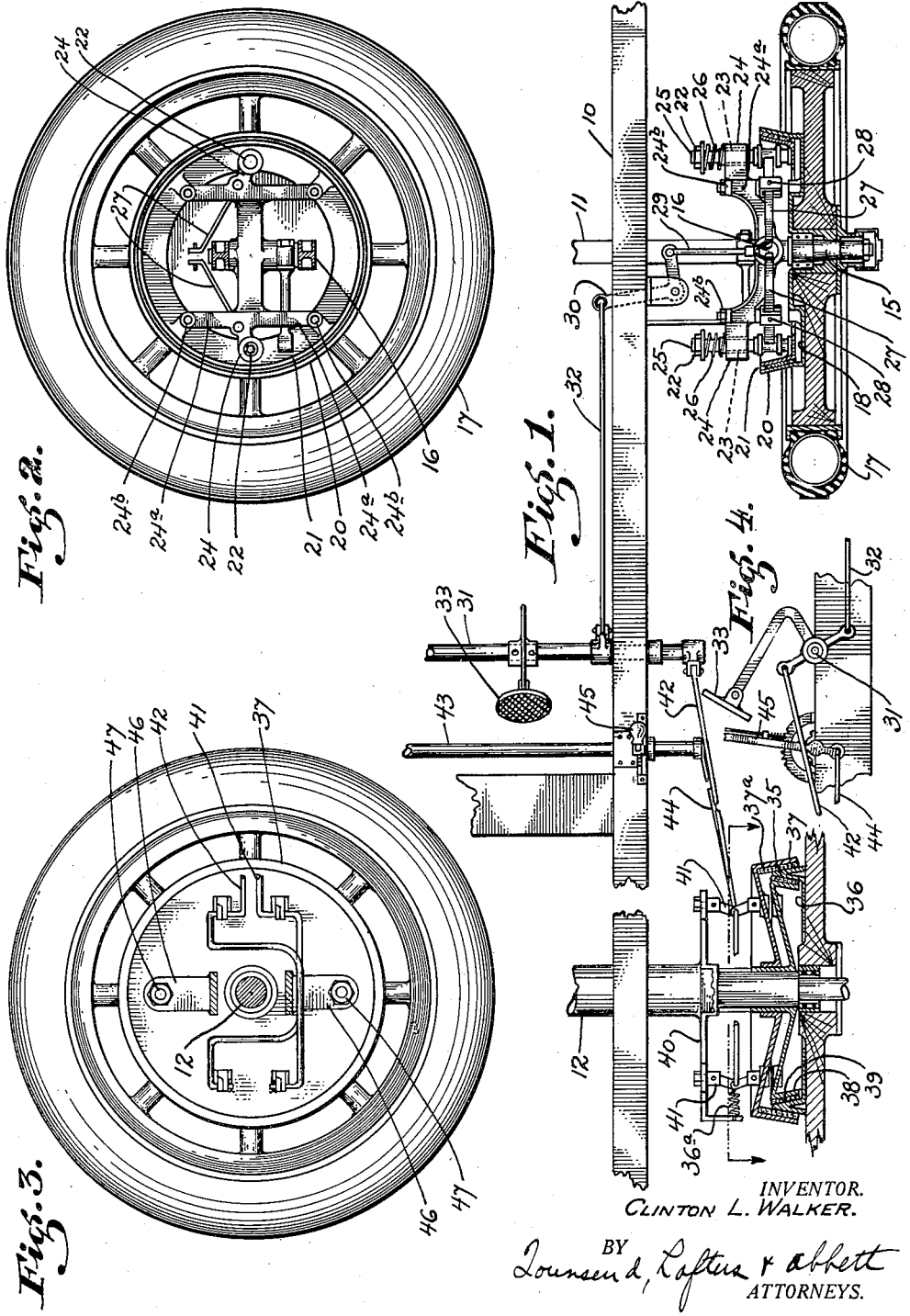
INVENTOR.
CLINTON L. WALKER.
BY
ATTORNEYS.

Patented July 31, 1934

1,968,185

UNITED STATES PATENT OFFICE 1,968,185

AUTOMOBILE BRAKE

Clinton L. Walker, Piedmont, Calif.

Application December 31, 1929, Serial No. 417,649

4 Claims. (Cl. 188—71)

This invention relates to brakes for automotive vehicles.

The contracting band and internal expanding shoe types of vehicle brakes have not proven entirely satisfactory principally because they are difficult to properly adjust. However, in these types of brakes the braking surface is limited and if the brakes are not maintained in exact adjustment the lining wears unevenly. This latter is due to the fact that the braking member changes its shape and if a proper adjustment is not maintained the pressure on the drum is not equal at all points. Therefore, it is the principal object of the present invention to provide a braking apparatus for motor vehicles which overcomes the shortcomings and disadvantages of prior braking apparatus.

I accomplish this by fitting each wheel with a rigid brake drum and shoe having complemental conical surfaces. This enables me to obtain a maximum of braking surface and insures that the pressure of the shoe on the drum will be equal throughout the entire braking area. Likewise in order to adjust the brake it is only necessary to axially adjust the shoe relative to the drum. Thus, the brakes may be easily maintained adjusted and equalized. The apparatus for actuating the brakes is simple and efficient and enables the brakes to be used on all four wheels.

One form which the invention may assume is exemplified in the following description and illustrated by way of example in the accompanying drawing, in which:

Fig. 1 is a fragmentary view in plan of a chassis of an automotive vehicle with the wheels and braking mechanisms therefor in section.

Fig. 2 is a view in elevation of the interior side of one of the front wheels of the vehicle.

Fig. 3 is a sectional view disclosing the interior side of one of the rear wheels and the braking mechanism mounted thereon.

Fig. 4 is a fragmentary view in side elevation of a portion of the chassis showing the connection between the brake levers and the brake rods.

Referring more particularly to the accompanying drawing, 10 indicates a vehicle chassis having a front axle 11 and a rear axle housing 12. The former is fitted with the usual front wheel spindles 15 connected with the axle 11 by pintles 16. Wheels 17 are mounted on the spindles 15 and on the rear axle in the ordinary manner.

Arranged concentrically of each front wheel and fixed to the inner surface thereof is a brake drum 18 having a frusto-conical peripheral flange 20 the inner surface of which constitutes its braking surface. This inner surface is adapted to be engaged by the exterior surface of a frusto-conical brake shoe 21. The braking surface of this shoe is lined and is complemental to the braking surface of the drum so by moving the shoe axially the brake may be rendered either effective or ineffective.

To operate the shoe 21 it is fitted with a plurality of studs 22 fixed at one end to the shoe. These studs are disposed at diametrically opposed points relative to the center of the shoe. The studs 22 slidably project through guide openings 23 formed in a guide bracket 24 relatively fixed to the axle spindle. At their free ends the studs 22 are fitted with adjusting nuts 25. Springs 26 are interposed between these nuts and the guide bracket 24 and constantly tend to maintain the brake disengaged.

To maintain the shoe in proper alignment the guide bracket 24 is formed with four arms 24a. The ends of these arms are positioned at radial points and spaced equal distances about the center of the shoe. The arms 24a slidably receive guide studs 24b which project axially from the shoe. This maintains the shoe in proper axial alignment with the drum.

To apply the brake I provide levers 27 which are pivoted intermediate their ends to the brackets 24 as at 28. The outer ends of the levers 27 are connected with spools which are adjustably mounted on the studs 22. The spools by their connection with the studs may be adjusted axially relative to the studs. The outer ends of the levers extend to a point substantially over the axial center of the spindle pintle. At this point the levers are connected with a cable 29 leading to one arm of a bell crank lever 30. This lever 30 is pivoted to the chassis and its other arm is connected with a brake shaft 31 by means of a brake rod 32. The shaft 31 may be operated through the medium of a brake pedal 33.

It is obvious that when the pedal 33 is depressed that a pull will be exerted on the cable 29 which will, through the medium of the levers 27, move the shoe axially toward the drum. When the pedal is released the springs 26 will move the shoe axially away from the drum.

To adjust the shoe relative to the drum the spools on the studs 22 are adjusted axially therealong. This, of course, adjusts the shoe relative to the levers 27 and enables the proper adjustment of the brake to be obtained.

It is obvious that as the connection between the cable 29 and the levers 27 is substantially in alignment with the axis of the spindle pintle, the wheel and brake mechanism may turn about the pintle without disturbing the operation of the brake. Thus, my brake may be used on all four wheels of a vehicle.

With reference to the rear wheel brakes I employ a different apparatus for operating the brakes. Reference being had to the drawing, it will be noticed that both the interior and exterior surfaces of the flange 35 of the drum 36 are frusto-conical and opposite so as to provide both an interior and an exterior braking surface. Co-operating with the exterior surface is an outer shoe 37 having a lined face 37a coinciding with the exterior surface of the drum. An inner shoe 38 is formed with a lined face 39 coinciding with the inner surface of the drum.

A bracket 40 is rigidly connected to the axle housing. This bracket is connected with each shoe 37 and 38 by two sets of toggle links 41 which are diametrically opposed. The sets of toggle links 41 of the outer shoe are connected together and to the foot brake shaft 31 by a brake rod 42. The toggle links of the inner shoe are connected together and to a parking or emergency brake shaft 43 by a brake rod 44. The latter shaft is fitted with a hand lever 45. Springs 36a are provided and constantly tend to maintain the shoes disengaged from the drum.

To aid in maintaining the shoes in alignment fixed arms 46 are provided and fitted with axial projecting spindles 47 on which the shoes 37 and 38 are slidable to insure their being maintained in correct alignment.

To adjust the shoes relative to the drum it is only necessary to alter the toggle link lengths which can be easily and quickly accomplished.

It is obvious that I have provided vehicle brakes wherein a maximum braking area can be obtained and wherein the shoes bear with equal pressure on all points of the drum. Also the brakes here disclosed can be easily and quickly adjusted and which will retain their braking efficiency regardless of slight wear.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In combination with the front axle of a vehicle, a front wheel spindle connected with the axle for swinging movement, a wheel on the spindle, a brake for the wheel including a drum fixed concentrically on the wheel, a shoe arranged concentrically of the drum, said shoe and drum having continuous and coinciding frusto-conical braking surfaces, a guide member fixed to the spindle, members fixed to the shoe and slidably engaging the guide member to guide the shoe axially with respect to the drum, operating means for moving the shoe into braking engagement with the drum, and spring means constantly urging the shoe out of engagement with the drum.

2. In combination with the front axle of a vehicle, a front wheel spindle connected with the axle for swinging movement, a wheel on the spindle, a brake for the wheel including a drum fixed concentrically on the wheel, a shoe arranged concentrically of the drum, said shoe and drum having continuous and coinciding frusto-conical braking surfaces, a guide member fixed to the spindle, members fixed to the shoe and slidably engaging the guide member to guide the shoe axially with respect to the drum, operating means for moving the shoe into braking engagement with the drum, said operating means including levers pivoted to the spindle intermediate their ends, the outer ends of the levers connected with the shoe, the inner ends of the levers extending to a point substantially in axial alignment with the pivotal point of the spindle, and an operating member connected with said levers at said point whereby swinging of the spindle relative to the axle will not affect the operation of the brake.

3. In combination with a vehicle front wheel assembly which comprises an axle, a spindle pivoted thereto and a wheel on the spindle, a brake comprising a drum fixed to the wheel, a shoe, said shoe and drum having coinciding frusto-conical braking surfaces, a guide member fixed to the spindle, members fixed to the shoe and slidably engaging the guide member to guide the shoe axially with respect to the drum, operating means for moving the shoe into braking engagement with the drum, and spring means constantly urging the shoe out of engagement with the drum.

4. In combination with a front axle of a vehicle, a front wheel spindle mounted on the axle for swinging movement, a wheel mounted on the spindle, a brake for said wheel including a brake drum fixed concentrically on the wheel, a brake shoe arranged concentrically of the drum, said shoe and drum having continuous and coinciding frusto-conical braking surfaces, a guide member fixed to the spindle, members fixed to said shoe and slidably engaging the guide member to guide the shoe axially with respect to the drum, spools adjustably mounted on said members intermediate the guide member and the shoe, operating means for the shoe including levers pivoted to the spindle intermediate their ends, the outer ends of said levers connected with said spools, the inner ends of the levers extending to a point substantially in axial alignment with the pivotal point of the spindle, and operating means connected with said levers at said point whereby swinging of the spindle relative to the axle will not affect the operation of the brake.

CLINTON L. WALKER.